United States Patent
Tarnawskyj et al.

(10) Patent No.: US 6,638,383 B2
(45) Date of Patent: Oct. 28, 2003

(54) DUAL CURING PROCESS FOR PRODUCING A SEAM

(75) Inventors: Ihor W. Tarnawskyj, Webster, NY (US); Joseph A. Swift, Ontario, NY (US); Christopher P. Manos, Rochester, NY (US); Theodore Lovallo, Williamson, NY (US); Gregory Toth, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 107 days.

(21) Appl. No.: 09/833,488

(22) Filed: Apr. 11, 2001

(65) Prior Publication Data

US 2002/0157786 A1 Oct. 31, 2002

(51) Int. Cl.⁷ .............................................. B29C 65/18
(52) U.S. Cl. ..................... 156/157; 156/159; 156/258; 156/304.5; 156/305; 156/306.9
(58) Field of Search ................................ 156/305, 258, 156/306.9, 157, 159, 304.5

(56) References Cited

U.S. PATENT DOCUMENTS

| | | | | |
|---|---|---|---|---|
| 2,574,094 A | * | 11/1951 | Fener et al. | |
| 4,430,146 A | * | 2/1984 | Johnson | |
| 5,549,193 A | * | 8/1996 | Schlueter et al. | |
| 5,837,090 A | * | 11/1998 | Binnie et al. | 156/305 |
| 5,942,301 A | * | 8/1999 | Schlueter et al. | |
| 6,368,440 B1 | * | 4/2002 | Yu et al. | |

FOREIGN PATENT DOCUMENTS

| EP | 928907 | * | 7/1999 |
|---|---|---|---|
| JP | 2000-161444 | * | 6/2000 |

* cited by examiner

Primary Examiner—Steven D. Maki
(74) Attorney, Agent, or Firm—Annette L. Bade

(57) ABSTRACT

A process for seaming seamed component for use in seaming members useful in electrostatographic, contact electrostatic, digital and other like machines, including: a) compounding an adhesive; b) forming the adhesive in contact with a first side of the seam and the mutually mating members; c) contacting the adhesive and first side of the seam to a first heated clamp; d) contacting the second side of the seam to a second heated clamp; e) subjecting the adhesive in contact with the mutually mating members to a first cure at a first temperature to form a cured adhesive; and f) subjecting the cured adhesive to a second cure at a second temperature to form a dual-cured adhesive, wherein the second temperature is higher than the first temperature.

24 Claims, 9 Drawing Sheets

DUAL CURING PROCESS FOR PRODUCING A SEAM

CROSS REFERENCE TO RELATED APPLICATIONS

Attention is directed to U.S. patent application Ser. No. 08/004,636 (D/97525) filed Jan. 8, 1998, entitled "Process and Apparatus for Producing an Endless Seamed Belt;" U.S. patent application Ser. No. 09/470,931 (D/99689) filed Dec. 22, 1999, entitled, "Continuous Process for Manufacturing Imagable Seamed Belts for Printers;" U.S. patent application Ser. No. 09/615,444 (D/99598), filed Jul. 13, 2000, entitled, "Polyimide Adhesive For Polyimide Component Interlocking Seams;" U.S. patent application Ser. No. 09/833,965 (D/A0895Q), filed Apr. 11, 2001, entitled "Polyvinyl Butyral and Conductive Carbon Filler Adhesive;" U.S. patent application Ser. No. 09/833,546 (D/A0584), filed Apr. 11, 2001, entitled "Imagable Seamed Belts Having Polyamide Adhesive Between Interlocking Seaming Members;" and U.S. patent application Ser. No. 09/833,507 (D/A0584Q), filed Apr. 11, 2001, entitled "Polyamide and Conductive Filler Adhesive." The disclosures of each of these references are hereby incorporated by reference in their entirety.

BACKGROUND OF THE INVENTION

The present invention is directed to processes for seaming components useful in electrostatographic, including digital, apparatuses. In specific embodiments, the present invention is directed to seaming processes useful for components such as seamed belts, and more specifically, to endless flexible seamed belts wherein an image can be transferred at the seam of the belt with little or no print defects caused by the seam. In embodiments, the present invention relates to processes for seaming xerographic component imagable seamed belts, wherein an adhesive is formed between mutually mating elements of a seam. In embodiments, the process includes two curing steps, and in preferred embodiments, the second cure is at a temperature higher than that of the first cure step. In embodiments, the seam is bonded using a first clamp and a second clamp, wherein the clamps may be heated. In an embodiment, the adhesive between seaming members comprises a resin, such as a hot-melt processable, thermosetting resin, preferably containing electrically conductive filler(s) dispersed or contained therein.

The seam produced by the process herein is strong enough to survive mechanical flexing while under tension, as the belt travels over various diameter rollers. The process herein, in embodiments, provides a seam in which the height differential between the seam and the rest of the belt is virtually nil. The process herein, in embodiments, provides a belt allowing for image transfer at the seam, which cannot be accomplished with known seamed belts. Image transfer is accomplished partly because the process provides a seam that possesses the desired conductivity and release properties required for sufficient transfer. Image transfer is further made possible because the process provides a seam that is virtually or completely free of bubbles, voids, and other inclusions, which may impact high quality image transfer at the seam region and/or reduce the mechanical strength of the seam. The process provides crosslinking of the adhesive into a strong, solid phase interface having the desired conductivity and release properties to function as an imagable seam. The present process, in embodiments, is further easy to control and low cost.

In a typical electrostatographic reproducing apparatus such as an electrophotographic imaging system using a photosensitive member, a light image of an original to be copied is recorded in the form of an electrostatic latent image upon a photosensitive member and the latent image is subsequently rendered visible by the application of a developer mixture. One type of developer used in such printing machines is a liquid developer comprising a liquid carrier having toner particles dispersed therein. Generally, the toner is made up of resin and a suitable colorant such as a dye or pigment. Conventional charge director compounds may also be present. The liquid developer material is brought into contact with the electrostatic latent image and the colored toner particles are deposited thereon in image configuration.

The developed toner image recorded on the imaging member is transferred to an image receiving substrate such as paper via a transfer member. The toner particles may be transferred by heat and/or pressure to a transfer member, or more commonly, the toner image particles may be electrostatically transferred to the transfer member by means of an electrical potential between the imaging member and the transfer member. After the toner has been transferred to the transfer member, it is then transferred to the image receiving substrate, for example by contacting the substrate with the toner image on the transfer member under heat and/or pressure.

Transfer members enable high throughput at modest process speeds. In four-color photocopier or printer systems, the transfer member also improves registration of the final color toner image. In such systems, the four component colors of cyan, yellow, magenta and black may be synchronously developed onto one or more imaging members and transferred in registration onto a transfer member at a transfer station.

In electrostatographic printing and photocopy machines in which the toner image is transferred from the transfer member to the image receiving substrate, it is desired that the transfer of the toner particles from the transfer member to the image receiving substrate be substantially 100 percent. Less than complete transfer to the image receiving substrate results in image degradation and low resolution. Complete transfer is particularly desirable when the imaging process involves generating full color images since undesirable color deterioration in the final colors can occur when the color images are not completely transferred from the transfer member.

Thus, it is desirable that the transfer member surface has excellent release characteristics with respect to the toner particles. Conventional materials known in the art for use as transfer members often possess the strength, conformability and electrical conductivity necessary for use as transfer members, but can suffer from poor toner release characteristics, especially with respect to higher gloss image receiving substrates.

Polyimide substrate transfer members are suitable for high performance applications because of their outstanding mechanical strength and thermal stability, in addition to their good resistance to a wide range of chemicals. However, the high cost of manufacturing unseamed polyimide belts has led to the introduction of a seamed belt.

In the electrostatic transfer applications, use of a seamed transfer polyimide member made by conventional seaming processes results in insufficient transfer in that the developed image occurring on the seam is not adequately transferred. This incomplete transfer is partially the result of the difference in seam height and the rest of the belt. A "bump" is formed at the seam, thereby hindering transfer and mechanical performance. The development of puzzle cut seams has increased the quality of transfer somewhat, by decreasing the seam height, thereby allowing smooth mechanical cycling. However, even with the improvements made with puzzle cut seams, quality imaging in the seamed area is not obtainable at present due, in part, to contrast in transfer caused by differences in electrical and release properties of known seaming adhesives and known seaming processes. Further, current seaming processes do not provide sufficient bonding strength at the seam, resulting in short belt life. In addition, the seam must have the appropriate surface properties in order to allow for sufficient toner release at the seam.

Currently, seam adhesives consist of insulating ultraviolet-curable epoxies and hot-melt adhesives. Present seaming processes consist of the use of ultraviolet light to cure the epoxy adhesives or heat and pressure to thermally cure the hot melt adhesives or heat and pressure to thermally bond or "weld" the seam. While these adhesives and related processes produce seamed belts that exhibit acceptable strengths at room temperature under tensile load, most undergo premature failure at elevated temperatures. Additionally, belts made by existing seaming processes have been found to perform poorly under some important dynamic test conditions.

Therefore, it is desired to provide a process which produces a more robust seam for puzzle cut and other types of seamed belts. Further, it is desired to provide a process for producing a seam having electrical, mechanical and toner release characteristics that closely match those of the robust substrates. In addition, it is desirable to provide a process for producing a seam which is imagable, thereby reducing or eliminating the presence of print or copy defects. Also, it is desired to provide a process for producing a seam in which the height differential between the seam and the rest of the belt is virtually nil. Moreover, it is further desired to provide a process for producing a seam that is virtually or completely free of bubbles, voids and other inclusions, which may impact high quality image transfer or strength of the seam region. It is further desirable to provide a process that is easy to control and low cost.

U.S. Pat. No. 5,549,193 relates to an endless flexible seamed belt comprising puzzle cut members, wherein at least one receptacle has a substantial depth in a portion of the belt material at the belt ends.

U.S. Pat. No. 5,721,032 discloses a puzzle cut seamed belt having a strength-enhancing strip.

U.S. Pat. No. 5,487,707 discloses a puzzle cut seamed belt having a bond between adjacent surfaces, wherein an ultraviolet cured adhesive is used to bond the adjacent surfaces.

U.S. Pat. No. 5,514,436 relates to a puzzle cut seamed belt having a mechanically invisible seam, which is substantially equivalent in performance to a seamless belt.

U.S. Pat. No. 6,318,223 discloses a process and apparatus for producing an endless seamed flexible belt.

U.S. Pat. No. 6,316,070 discloses unsaturated carbonate adhesives for component seams.

U.S. Pat. No. 6,379,486 discloses process for seaming interlocking seams of polymide component using polyimide adhesive.

U.S. Pat. No. 6,327,454 discloses imageable seamed belts having fluoropolymer adhesives between interlocking seaming members.

U.S. Pat. No. 6,387,465 discloses imageable seamed belts having fluoropolymer overcoat.

U.S. Pat. No. 6,527,105 discloses imageable seamed belts having hot melt processable, thermosetting resin and conductive filler adhesive between interlocking seaming members.

SUMMARY OF THE INVENTION

Embodiments of the present invention include: A process for seaming a film component, wherein the film component comprises a seam having a first side and a second side and said seam comprising mutually mating members, wherein the process comprises: a) compounding an adhesive; b) forming the adhesive in contact with the first side of the seam and the mutually mating members; c) contacting the adhesive and first side of the seam to a first heated clamp; d) contacting the second side of the seam to a second heated clamp; e) subjecting the adhesive in contact with the mutually mating members to a first cure at a first temperature to form a cured adhesive; and f) subjecting the cured adhesive to a second cure at a second temperature to form a dual-cured adhesive, wherein the second temperature is higher than the first temperature.

Embodiments of the present invention also include: a process for seaming a puzzle cut component, wherein the component comprises a puzzle cut seam having a first side and a second side, and the seam comprising mutually mating members, each member having a puzzle cut form, wherein the process comprises: a) compounding an adhesive; b) forming the adhesive in contact with the first side of the seam and in further contact with the puzzle cut mutually mating members; c) contacting the adhesive and first side of the seam to a first heated clamp; d) contacting the second side of the seam to a second heated clamp; e) subjecting the adhesive in contact with the mutually mating members to a first cure at a first temperature to form a cured adhesive; and f) subjecting the cured adhesive to a second cure at a second temperature to form a dual-cured adhesive, wherein the second temperature is higher than the first temperature.

Embodiments further include: a process for seaming a film component, wherein the film component comprises a seam having a first side and a second side and comprising mutually mating members, wherein the process comprises: a) compounding an adhesive comprising a hot-melt processable, thermosetting resin and an electrically conductive filler; b) forming the adhesive in contact with the first side of the seam and the mutually mating members; c) contacting the adhesive and first side of the seam to a first heated clamp; d) contacting the second side of the seam to a second heated clamp; e) subjecting the adhesive in contact with the mutually mating members to a first cure at a first temperature to form a cured adhesive; and f) subjecting the cured adhesive to a second cure at a second temperature to form a dual-cured adhesive, wherein the second temperature is higher than the first temperature.

BRIEF DESCRIPTION OF THE DRAWINGS

For a better understanding of the present invention, reference may be had to the accompanying figures.

DETAILED DESCRIPTION OF THE PRESENT INVENTION

The present invention relates to a process for producing a strong seam useful in seaming flexible mutually mating or other seamed belt components. In embodiments, the process includes two curing steps, and in preferred embodiments, the second cure is at a temperature higher than that of the first cure step. In embodiments, the process includes two curing steps where during the first step, the seam region is preferably subjected to a clamping pressure formed by a first heated clamping member and a second heated clamping member. In embodiments, the adhesive and seam are subjected at a first temperature wherein the first and second members can be heated to different temperatures to form a cured adhesive. In embodiments, the second cure is at a temperature higher than that of the first cure step. In embodiments, the adhesive comprises a resistive, hot-melt processible, thermosetting resin. In embodiments, the adhesive also comprises an electrically conductive filler. The process provides a seam, in embodiments, which is imagable and wherein the occurrence of copy and print defects at the seam is reduced or eliminated. Image transfer is accomplished partly because the present seam possesses the desired conductivity and release properties required for sufficient transfer. Image transfer is further made possible because the seam of the present invention is virtually or completely free of bubbles, voids, and other inclusions, which may impact high quality image transfer at the seam region. In embodiments, the process provides a component wherein the adhesive seam and component material share electrical, mechanical and toner release characteristics. The present process further provides, in embodiments, a component having virtual uniform thickness at the adhesive seam. The present process, in embodiments, is relatively low in unit manufacturing cost.

In preferred embodiments, the process can be used to seam a component such as a belt, for example, an intermediate transfer belt, sheet, roller, or film useful in xerographic, including digital, apparatuses. However, the process can also be used to seam components such as belts, rollers, drelts, and the like, and belts used for many different processes and components such as photoreceptors, fusing members, transfix members, bias transfer members, bias charging members, developer members, image bearing members, conveyor members, cleaning members, and other members for contact electrostatic printing applications, xerographic applications, including digital, and the like. Further, the process herein can be used to seam components used for both liquid and dry powder xerographic architectures.

Figure 1:
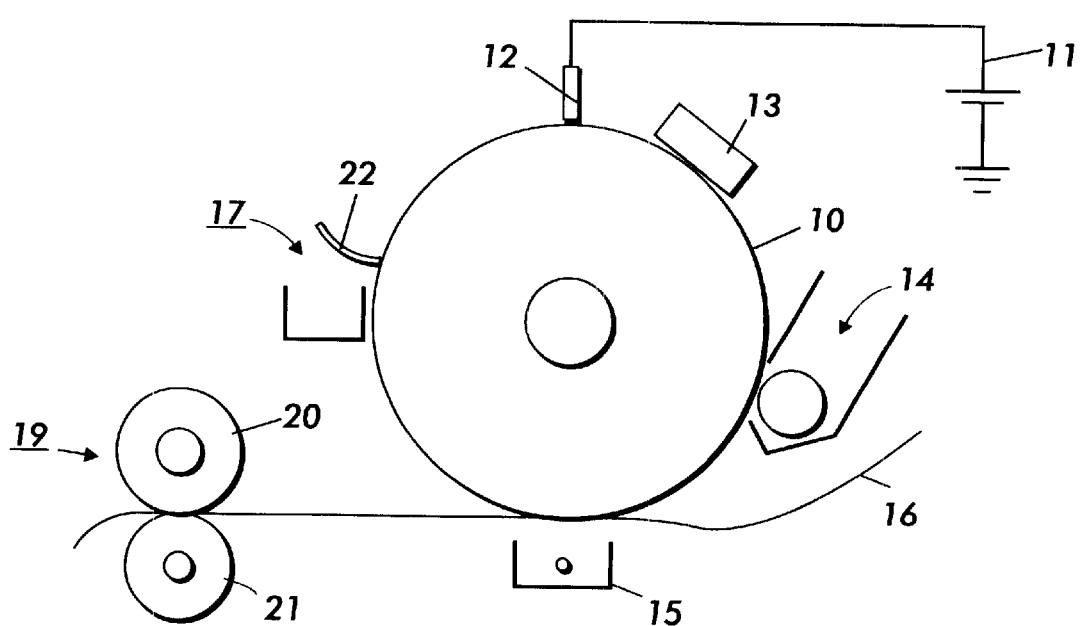
FIG. 1 is a depiction of an electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Preferably, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
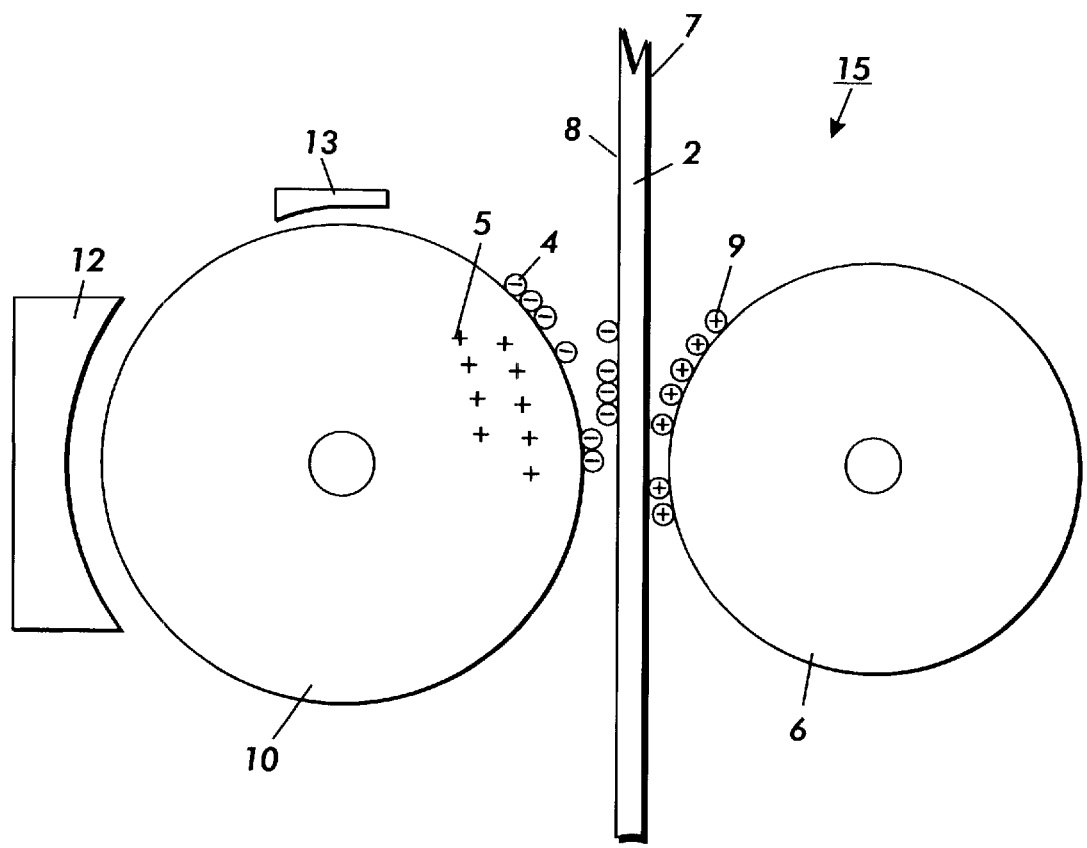
FIG. 2 is an enlargement of a transfer system according to an embodiment of the present invention.

FIG. 2 is a schematic view of an image development system containing an intermediate transfer member. The present adhesive can be used to seam such an intermediate transfer member. FIG. 2 demonstrates a transfer apparatus 15 comprising a transfer member 2 positioned between an imaging member 10 and a transfer roller 6. The imaging member 10 is exemplified by a photoreceptor drum. However, other appropriate imaging members may include other electrostatographic imaging receptors such as ionographic belts and drums, electrophotographic belts, and the like.

In the multi-imaging system of FIG. 2, each image being transferred is formed on the imaging drum by image forming station 12. Each of these images is then developed at developing station 13 and transferred to transfer member 2. Each of the images may be formed on the photoreceptor drum 10 and developed sequentially and then transferred to the transfer member 2. In an alternative method, each image may be formed on the photoreceptor drum 10, developed, and transferred in registration to the transfer member 2. The multi-image system can be a color copying system. In this color copying system, each color of an image being copied is formed on the photoreceptor drum. Each color image is developed and transferred to the transfer member 2. As above, each of the colored images may be formed on the drum 10 and developed sequentially and then transferred to the transfer member 2. In the alternative method, each color of an image may be formed on the photoreceptor drum 10, developed, and transferred in registration to the transfer member 2.

After latent image forming station 12 has formed the latent image on the photoreceptor drum 10 and the latent image of the photoreceptor has been developed at developing station 13, the charged toner particles 4 from the developing station 13 are attracted and held by the photoreceptor drum 10 because the photoreceptor drum 10 possesses a charge 5 opposite to that of the toner particles 4. In FIG. 2, the toner particles are shown as negatively charged and the photoreceptor drum 10 is shown as positively charged. These charges can be reversed, depending on the nature of the toner and the machinery being used.

A biased transfer roller 6 positioned opposite the photoreceptor drum 10 has a higher voltage than the surface of the photoreceptor drum 10. As shown in FIG. 2, biased transfer roller 6 contact charges the backside 7 of transfer member 2 with a positive charge. In an alternative embodiment, a corona or any other charging mechanism may be used to charge the backside 7 of the transfer member 2.

The negatively charged toner particles 4 are attracted to the front side 8 of the transfer member 2 by the positive charge 9 on the backside 7 of the transfer member 2.

Figure 3:
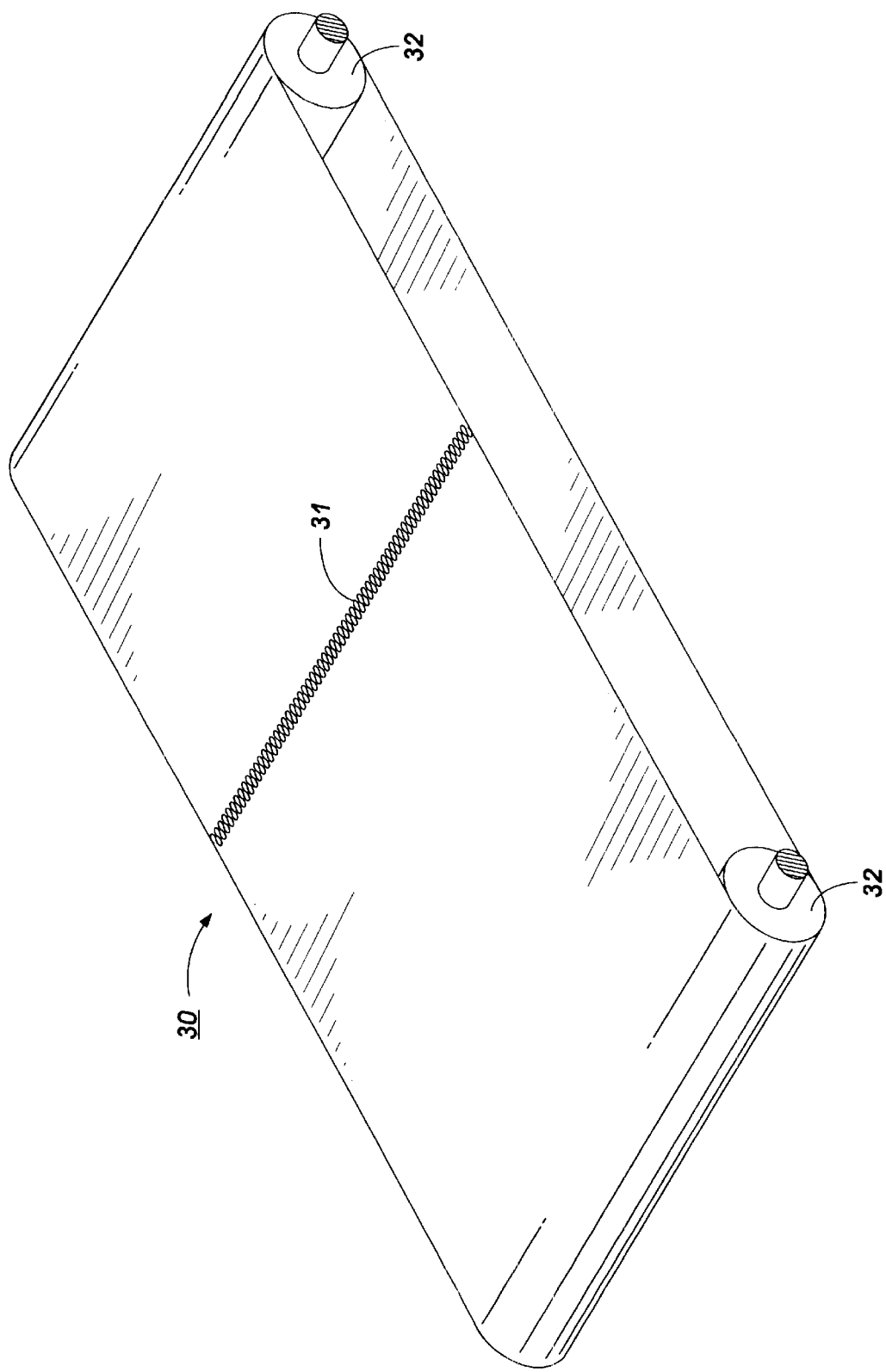
FIG. 3 is an enhanced view of an embodiment of a belt configuration and seam according to the present invention.

FIG. 3 demonstrates an example of an embodiment of a belt. Belt 30 is demonstrated with seam 31. Seam 31 is pictured as an example of one embodiment of a puzzle cut seam. However, the present process can be used for other seams such as overlapping seams and seams with mutually mating elements that are not in a puzzle cut form. The belt is held in position and turned by use of rollers 32. Note that the mechanical interlocking relationship of the seam 31 is present in a two-dimensional plane when the belt 30 is on a flat surface, whether it be horizontal or vertical. While the seam is illustrated in FIG. 3 as being perpendicular to the two parallel sides of the belt, it should be understood that it might be angled or slanted with respect to the parallel sides. This enables any noise generated in the system to be distributed more uniformly and the forces placed on each mating element or node to be reduced.

The process of the present invention can be used to provide a seam having a thin and smooth profile, of enhanced strength, improved flexibility and extended mechanical life. The belt ends can be held together by the geometric relationship between the ends of the belt material, which are fastened together by a puzzle cut or other suitable end cut geometry. In the puzzle cut embodiment, the puzzle cut seam can be of many different configurations, but is one in which the two ends of the seam interlock with one another in a manner of a puzzle. Specifically, the mutually mating elements comprise a first projection and a second receptacle geometrically oriented so that the second receptacle on the first end receives the first projection on the second end and wherein the first projection on the first end is received by the second receptacle on the second end. The seam has a kerf, void or crevice between the mutually mating elements at the two joining ends of the belt, and that crevice can be filled with an adhesive according to the present invention. The opposite surfaces of the puzzle cut pattern are bound or joined together to enable the seamed flexible belt to essentially function as an endless belt. The seam including the puzzle cut members, can be held together by a resistive, hot-melt processable, thermosetting adhesive, which is compatible with the rest of the belt. The belt, in embodiments, provides improved seam quality and smoothness with substantially no thickness differential between the seam and the adjacent portions of the belt.

Figure 4:
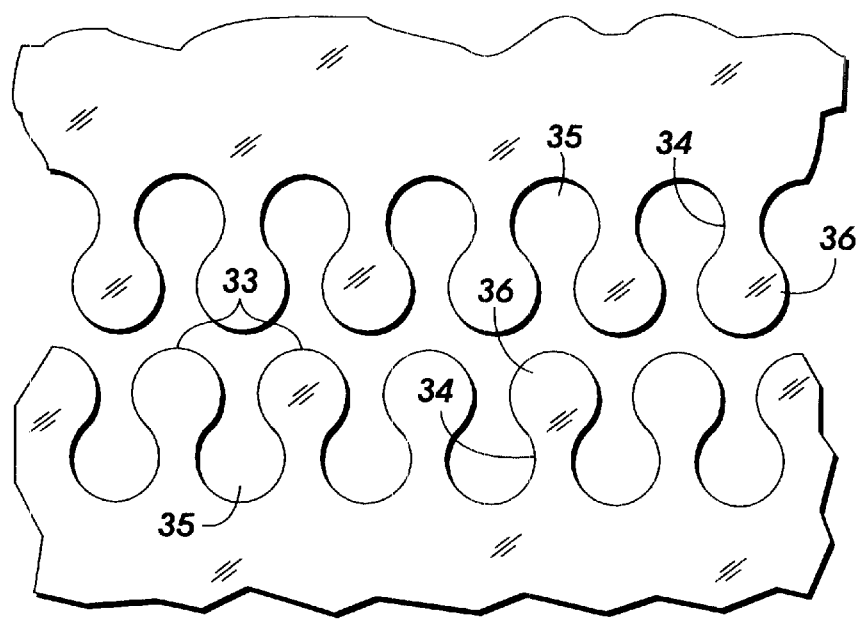
FIG. 4 is an enlargement of a puzzle cut seam having head and neck members according to one embodiment of the present invention.
Figure 5:
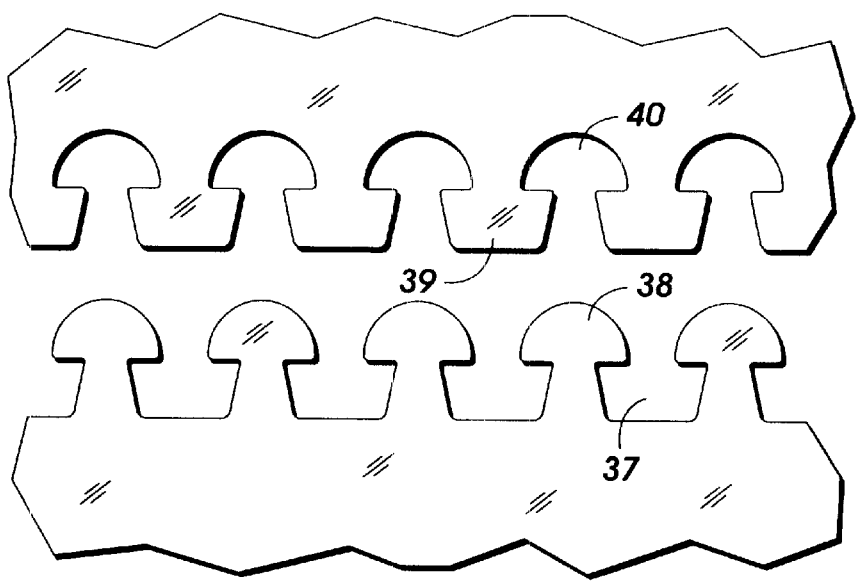
FIG. 5 is an enlargement of a puzzle cut seam having mushroom-shaped puzzle cut members according to another embodiment of the present invention.
Figure 6:
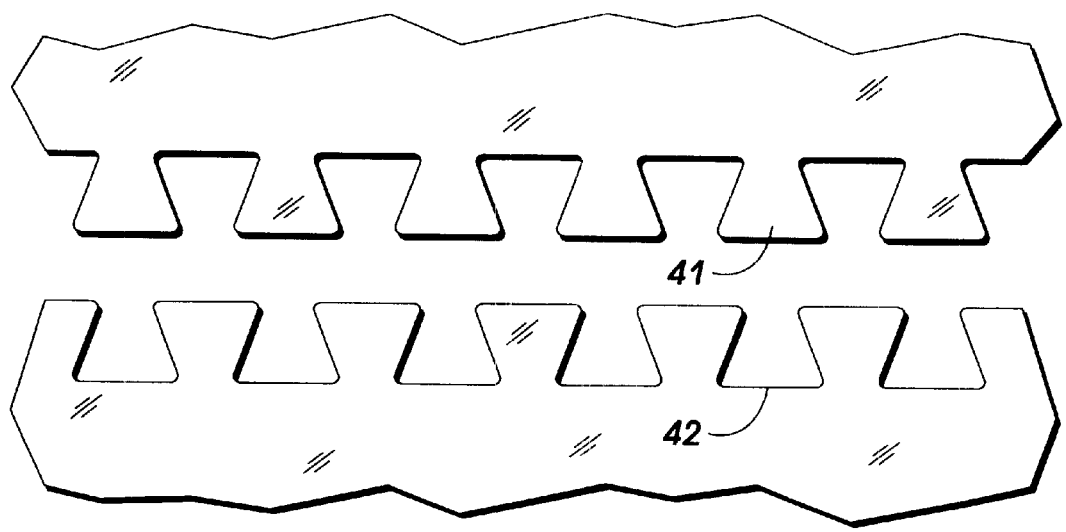
FIG. 6 is an enlargement of a puzzle cut seam having dovetail members according to another embodiment of the present invention.
Figure 7:
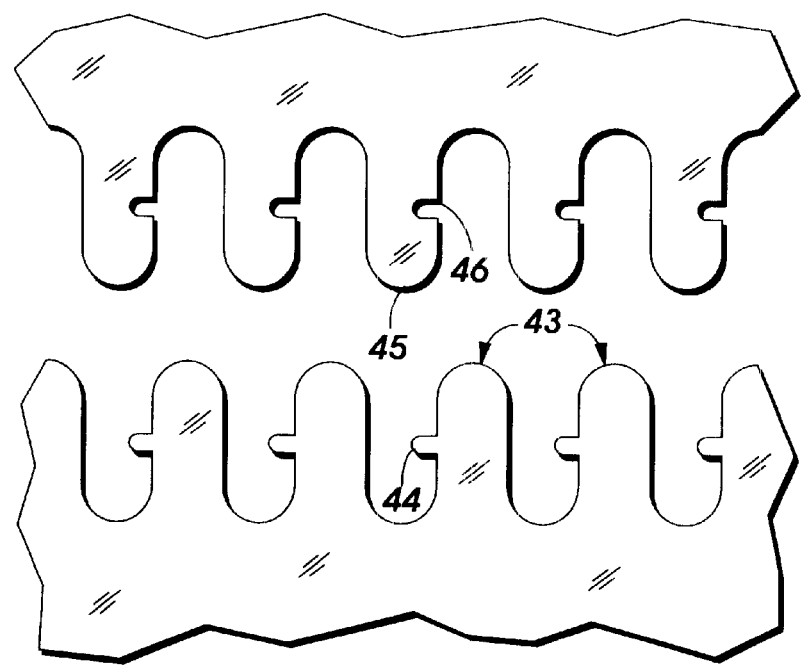
FIG. 7 is an enlargement of a puzzle cut seam having recessor and teeth members according to another embodiment of the present invention.

An example of an embodiment of a puzzle cut seam which may contain the adhesive, has two ends, each of the ends comprising puzzle cut members or mutually mating elements is shown in FIG. 4. The puzzle cut pattern may take virtually any form, including that of nodes such as identical post or neck 34 and head 33 or node patterns having projections 36 and receptacles 35 which interlock when brought together as illustrated in FIG. 4. The puzzle cut pattern may also be of a more mushroom-like shaped pattern having first projections 38 and 39 and second receptacles 40 and 37 as illustrated in FIG. 5, as well as a dovetail pattern as illustrated in FIG. 5 having first projections 41 and second receptacles 42. The puzzle cut pattern illustrated in FIG. 7 has a plurality of first fingers 43 with interlocking teeth 44 and plurality of second fingers 45 which have recesses 46 to interlock with the teeth 44 when assembled. The interlocking elements can all have curved mating elements to reduce the stress concentration between the interlocking elements and permit them to separate when traveling around curved members such as the rolls 32 of FIG. 3. It has been found that with curved mating elements that the stress concentration is lower than with square corners where rather than the stress being uniformly distributed it is concentrated leading to possible failure.

Figure 8:
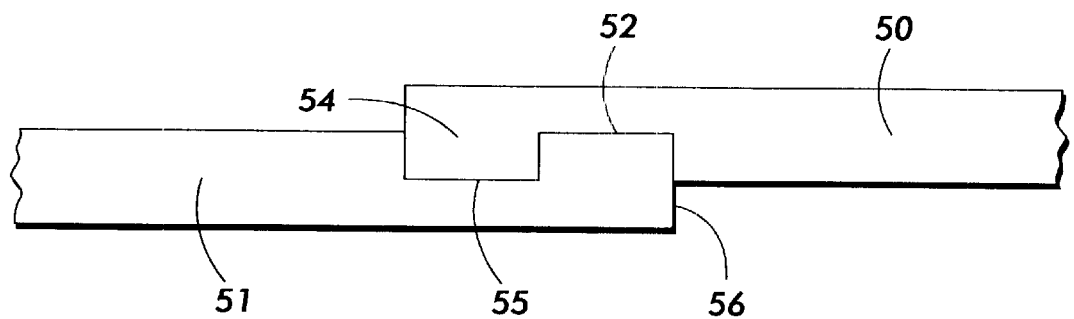
FIG. 8 is an enlargement of a puzzle cut seam having receptacle and projection members of differing depth according to another embodiment of the present invention.

Another example of a puzzle cut seam is shown in FIG. 8 in which the mutually mating elements or puzzle cut members comprise a first member 50 and a second member 51, wherein the first member 50 comprises a first receptacle 52 and a first projection 54, and the second member 51 comprises a second receptacle 55 and a second projection 56. The first receptacle 52 of the first member 50 receives the second projection 56 of the second member 51, and the second receptacle 55 of the second member 51 receives the first projection 54 of the first member 50. In order to reduce the height differential between the seamed portion and the adjacent, unseamed portion of the belt, the second receptacles can be formed within their individual members at a substantial depth in a portion of the belt at the belt ends.

The height differential between the seam and the rest of the component (the nonseamed portions of the component) can be practically nil, or from about −25 to about +50 micrometers, preferably from about −5 to about +5 micrometers, and particularly preferred of from about −1 to about +1 micrometers. In embodiments, any differential between the seam and the rest of the belt is gradual or tapered, as a step may result in print defects.

Figure 9:
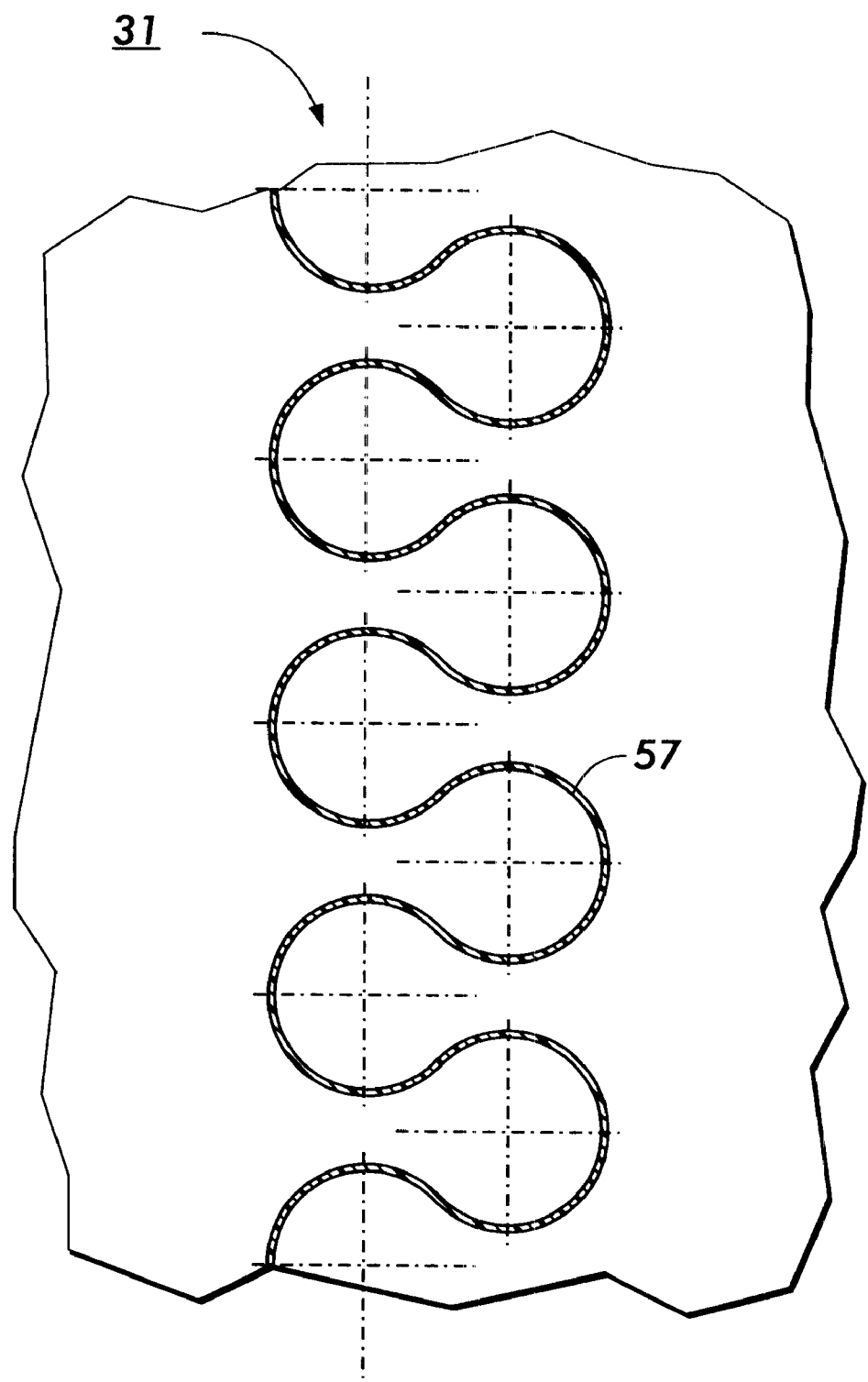
FIG. 9 is an enlarged version of a belt according to one embodiment of the present invention and demonstrates a crevice between the puzzle cut members, the crevice containing an adhesive.

A resistive, hot-melt processible, thermosetting adhesive is preferably present between the seam, and placed in the crevice between the puzzle cut members to a thickness of from about 0.0001 to about 50 micrometers. As shown in one embodiment of a puzzle cut seam 31 according to the present invention, the adhesive is present between the puzzle cut members and at the seam crevice 57 of FIG. 9.

The adhesive is preferably chosen to have a resistivity within the range desired for electrostatic transfer of toner. Preferably, the resistivity of the seam is the same or similar to that of the belt in order to provide the same electrical properties for the seam and the rest of the belt. A volume resistivity for toner transfer performance is from about $10^1$ to about $10^{13}$ ohm-cm, and in embodiments, from about $10^8$ to about $10^{11}$ ohm-cm. This can be the volume resistivity for the seam and the rest of the belt. In embodiments, the adhesive makes good electrical contact with the belt material. When the belt and the seam of the belt have a same or substantially the same electrical resistance, the toner transfer at the seam is the same or substantially the same as the transfer at the belt. Such transfer at the seam provides an invisible or substantially invisible seam.

The electrical properties can be tailored by varying the amount of fillers, by changing the type of filler added, and/or by changing the curing procedure.

An example of an adhesive for use with a component seam, can be a resistive, hot-melt processible, thermosetting composite. By "resistive," Applicants refer to an adhesive composite with electrical resistivity falling in the range of from about $10^6$ to about $10^{13}$ ohm-cm. By the term "hot-melt processible," Applicants are referring to a resin which will melt and flow under conditions of applied heat and pressure. By the term "thermosetting resin," Applicants are referring to a resin which upon sufficient applied heating, will undergo a chemical reaction, for example crosslinking, that causes a permanent change of state of the resin to an insoluble, intractable and thermally stable form. By the phrase "second filler different from the first filler," Applicants are referring to the use of two fillers, which are not exactly the same, and are distinct from one another in some way. For example, two forms of fluorinated carbon (such as, for example, ACCUFLUOR® 2028 and ACCUFLUOR® 2065) would be fillers that are different from each other even though they are both types of fluorinated carbon.

Examples of resistive, hot-melt processable, thermosetting adhesives include polyvinyl butyral composites comprising PVB resins, phenolic composites comprising phenolic resins, epoxy composites comprising epoxy resins, and mixtures thereof. Examples of polyvinyl butyral (PVB) composites include composites of PVB resins (Butvars® from Monsanto, PLYMASTER® 2130 adhesive from Norwood Coated Products, and the like), which may be used in combination with one or more of the following: phenolics (for example, Santolinks® from Solutia™, and the like), amino resins (for example, Resimines® from Solutia™, and the like), rosin derivatives (for example, Staybelite™ Esters from Hercules Inc., and the like), and other resins or modifiers. Examples of commercially available phenolic composites such as nitrile-phenolic composites which include PLYMASTER® PM204, PM212, PM216, PM220, and HT4033 adhesives from Norwood Coated Products, nitrile-phenolics available from Scapa Tapes, and composites comprising nitrile phenolic acrylic resins such as MODAR® 816, 824HT, and the like from Ashland Chemicals. Examples of epoxy composites include those available from Scapa Tapes, 3M™ and others.

Another adhesive for use with a belt seam, is an adhesive comprising a polyamide resin. In embodiments, the polyamide resin is alcohol-soluble. By "alcohol-soluble," Applicants refer to materials that dissolve in alcohols such as butanol, ethanol, methanol and the like. In embodiments, the polyamide resin has functional pendant groups selected from the group consisting of methoxy, ethoxy and hydroxy pendant groups. In embodiments, the pendant functional group is a methoxy methylene group. In embodiments, the polyamide has the following formula:

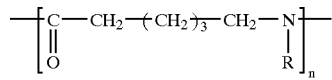

wherein n is a number of from about 50 to about 1,000, or from about 150 to about 500, or about 270, and wherein R is selected from the group consisting of hydrogen; alkyl having from about 1 to about 20 carbons, or from about 1 to about 10 carbons, such as methyl, ethyl, propyl and the like; alkoxy having from about 1 to about 20 carbons, or from about 1 to about 10 carbons such as methoxy, ethoxy, propoxy and the like; alkyl alkoxy having from about 1 to about 20 carbons, or from about 1 to about 10 carbons such as methyl methoxy, methyl ethoxy, ethyl methoxy, methyl dimethoxy, methyl trimethoxy, and the like; and alkylene alkoxy having from about 1 to about 20 carbons, or from about 1 to about 10 carbons such as methylene methoxy, ethylene ethoxy, and the like. In embodiments, monomers of the above formula can be included in an adhesive composition, wherein R in the monomers can be hydrogen, methylene methoxy, and methylene dimethoxy, or R in the adhesive composition can be from about 40 to about 80 mole percent hydrogen, or from about 50 to about 65 mole percent hydrogen, or about 64 mole percent hydrogen; and from about 20 to about 45 mole percent methylene methoxy, or from about 30 to about 35 mole percent methylene methoxy, or about 32 mole percent methylene methoxy; and from about 1 to about 10 mole percent methylene dimethoxy, or from about 1 to about 5 mole percent methylene dimethoxy, or about 4 mole percent methylene dimethoxy. Typical commercially available alcohol-soluble polyamide polymers suitable for use herein include those sold under the tradenames LUCKAMIDE® 5003 from Dai Nippon Ink, NYLON® 8, CM4000® and CM8000® both from Toray Industries, Ltd., and other N-methylene methoxy pendant polyamides such as those prepared according to the method described in Sorenson and Campbell, "Preparative Methods of Polymer Chemistry," second edition, pg. 76, John Wiley & Sons, Inc., 1968, and the like, and mixtures thereof.

At least one type of suitable, fine powder, conductivity-enhancing filler that is uniformly dispersed without agglomerates in the above resins, can be used with the present adhesive. The filler(s) can be a carbon filler, metal or metal oxide filler, doped metal oxide filler, conductive polymer filler, charge transporting molecule, or other conductive filler or blends thereof. The filler(s) can be a carbon filler such as carbon black, graphite, or the like, and can be a fluorinated carbon filler. Examples of fluorinated carbons include those having the formula $CF_x$ with x representing the number of fluorine atoms and generally being up to about 1.5, preferably from about 0.01 to about 1.5, and particularly preferred from about 0.04 to about 1.4. Other fluorinated carbons are poly(dicarbon monofluoride) which is usually written in the shorthand manner $(C_2F)_n$. Fluorinated carbons include those described in U.S. Pat. No. 4,524,119 to Luly et al., the subject matter of which is hereby incorporated by reference in its entirety, and those having the tradename ACCUFLUOR®. ACCUFLUOR® is produced by Advance Research Chemicals, Inc., Catoosa Okla. Examples include ACCUFLUOR® 2028, ACCUFLUOR® 2065, ACCUFLUOR® 1000, and ACCUFLUOR® 2010. ACCUFLUOR® 2028 and ACCUFLUOR® 2010 have 28 and 11 percent by weight fluorine, respectively, based on the weight of fluorinated carbon. ACCUFLUOR® 1000 and ACCUFLUOR® 2065 have 62 and 65 percent by weight fluorine, respectively, based on the weight of fluorinated carbon. Also, ACCUFLUOR® 1000 comprises carbon coke, whereas ACCUFLUOR® 2065, 2028 and 2010 all comprise conductive carbon black. These fluorinated carbons are of the formula $CF_x$ and are formed by the reaction of $C+F_2=CF_x$.

Examples of metal oxide fillers include titanium dioxide, tin (II) oxide, aluminum oxide, indium-tin oxide, magnesium oxide, copper oxide, iron oxide, and the like, and mixtures thereof.

Examples of polymer fillers include polypyrrole, polyacrylonitrile (for example, pyrolyzed polyacrylonitrile), polyaniline, polythiophenes, and mixtures thereof.

Examples of charge transporting molecules include bis (dihydroxy diethylamino-)triphenyl methane (DHTPM), bis (diethylamino) triphenyl methane (TPM), dihydroxy tetraphenyl biphenylene diamine (DHTBD), and the like, and mixtures thereof. Particularly preferred charge transporting molecules include DHTPM and DHTBD.

In embodiments, more than one type of filler, such as a carbon black filler and a fluorinated carbon filler, or two types of fluorinated carbons, are used in the resin.

The filler(s) can be present in the adhesive in a total amount of from about 1 to about 40, or from about 4 to about 10 percent by weight of total solids. Total solids, as used herein, refers to the amount of filler, optional compatibilizer, other possible additives, resin and other solids present in the adhesive.

In general, the process for seaming using the adhesive herein involves compounding in a suitable solvent, such as a blend of ethanol and methylethylketone, the resin with the filler, followed by drying and curing of the liquid-phase composite into a solid phase, thin layer, adhesive film. The use of a compatibilizer additive is preferred to reliably achieve the desired electrical properties at minimal loading of the conductive filler.

More specifically, the process entails compounding either in the melt phase below the critical temperature where crosslinking occurs, or in a suitable solution, with a conductive filler or other suitable conductivity enhancing filler. This is followed by forming the liquid-phase composite into a solid phase, thin layer, adhesive film by means of blade-coating, spray coating, or extruding the liquid phase onto a release backing. Preferably a low temperature drying/curing procedure is employed to remove solvents and dry the liquid-phase adhesive.

The adhesive film composite, with or without a removable release backing, is then applied to align with only the puzzle-interlocked seamed region of the component. The adhesive in solution may be applied at a seam and between interlocking seaming members, by any suitable means including liquid means such as using a cotton-tipped applicator, liquid dispenser, glue gun or the like, or by dry processes such as by using a dry tape. An amount of adhesive sufficient to fill the seam when dry is added between interlocking seaming members.

Figure 11:
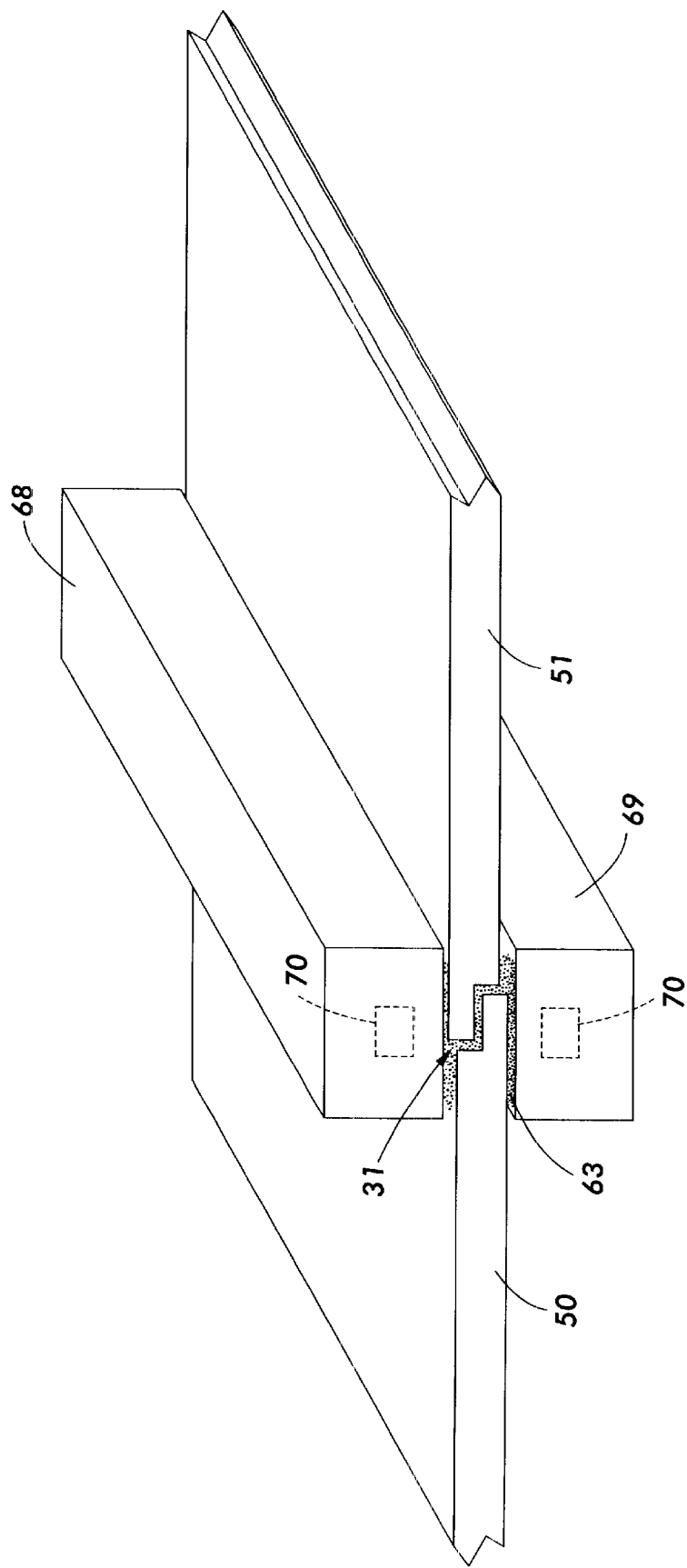
FIG. 11 is a cross sectional view of the heated clamping device used in the seaming process according to a preferred embodiment of the invention.

The seam is then pressed between parallel heated plates as shown in FIG. 11, for example between the jaws of a Vertrod seam welder. The seam can then be cured by various methods.

Curing procedures useful in curing the seam include thermal curing and infrared curing. Examples of heat curing include use of moderate to high heat once the adhesive is placed upon the seam crevice and heated while under the clamping pressure of the device shown in FIG. 11. This pressure-assisted heating enables the adhesive to melt and flow into the seam crevice and also induces the crosslinking/solidification reaction. In general, higher clamping pressures and higher temperatures serve to increase the rate of crosslinking and thereby shorten seam fabrication processing time and increase the rate at which components can be manufactured. Often, a second post cure is desired in order to assure that the crosslinking reaction has been driven to the required level and to achieve maximal seam strength. Preferably in the present invention, the seam is subjected to dual curing or two separate cure steps while the seam is held within the heated plates. The first heating step enables the adhesive flow and initiates curing/solidification. The second cure is conducted at a higher temperature than the first and enables further curing of the adhesive and assures a high strength seam. The dual cure procedure provides a seam virtually or completely free of bubbles or voids that can interfere with transfer at the seam.

Examples of curing temperatures for curing during adhesive preparation and for curing after the adhesive has been welded between seaming members include from about 40 to about 200° C., or from about 40 to about 150° C., at a time of from about 1 second to about 24 hours, or from about 1 minutes to about 2 hours, or from about 5 minutes to about 15 minutes. Naturally, these conditions depend upon the melt-flow and curing characteristics of the adhesive selected for the seaming process. The pressure during the heat curing is generally from about 0.5 psi to about 100 psi, or from about 2 psi to about 60 psi. Within practical limits, increased pressure enables welding at lower temperatures and vise versa. The upper limit for application of pressure is usually the point where the belt begins to show signs of deformation under the pressure. Therefore, the optimal pressure is selected such that the process cycle time is as short as possible given the adhesive that is selected and the point where no deformation, or other deleterious change, occurs within the heated-pressure zone.

Heat may be applied by, for example, a welder, heat gun, oven, or other suitable means. Preferably, according to FIG. 11, a parallel heated plate welder consisting of a first clamp 68 having optional heating element 70 and a second clamp 69 having optional heating element 70 is used to provide a clamping pressure to the adhesive-joined seam region of the belt. The adhesive 63 is placed between seaming members at the seam 31. The adhesive 63 can be in contact with either of the clamps. FIG. 11 demonstrates an embodiment wherein adhesive 63 is held in place by a first clamp 68. The first and second clamps are brought together and exert pressure on the adhesive, causing it to melt and/or flow into the seam between seaming members.

In practice, clamping pressures preferably are uniform to within about 20 or 30 psi, or within about 1 to about 2 psi across the entire seam region. The pressures can be uniform within about 10 to about 20 percent across the entire span of the clamped seam. The plates or clamps can be heated prior to the belt being introduced thereto, or alternatively, can be rapidly heated after the belt is secured in place. The first and second clamps can be heated to the same temperature, or alternatively, the temperature of the plate opposing the side of the belt that contains the adhesive layer (for example, the second plate 69 shown in FIG. 11) can be heated hotter than the other plate. In practice, where the adhesive is applied as a thin layer on one of the surfaces of the seam, the second plate or clamp (or the plate opposite the adhesive side) is heated to a temperature between from about 1 and about 100° C. hotter than the other plate, or between about 5 and about 25° C. hotter, or between about 10 and about 20° C. hotter than the other plate.

A second post-cure is preferably carried out in order to sufficiently crosslink the lower molecular weight oligomers into a higher molecular weight polymeric network. In embodiments, the second post cure occurs at a higher temperature than the first cure. The temperature of the second cure is, for example, from about 120 to about 250° C., or from about 150 to about 200° C. at a time of from about 30 seconds to about 24 hours, or 10 minutes to about 1 hour, and at a pressure of from about 0.5 psi to about 100 psi, or from about 2 psi to about 60 psi.

After the second cure, a dual-cured adhesive is formed. After the preliminary cure of the adhesive resulting from the preferred two-temperature initial cure, the temperature of the first plate can be increased to that equal of the second plate for the second-stage final cure. Alternately, both plates can be increase to the same final cure temperature or can be increased to different temperatures according to the desire to minimize the process cycle time or minimize the use of energy or other goal.

Following the second cure, the seam can be subjected to sanding and/or polishing to remove excess adhesive and to bring the seam area topography in line with the rest of the component. These sanding and/or polishing steps also smooth the belt seam.

A suitable release material can be employed on the surfaces of the heated plates to assure that the adhesive does not stick to these surfaces, and thereby minimizing the level of maintenance that is required for a continuous operation of the process. Examples of such release materials include talc, polyethylene film or powder, Teflon® or Teflon®-like films or powders, silicone film, or combinations thereof, and the like. Preferably, the release material is a durable solid film-forming material or coating that can be applied directly to the plates and will not adversely affect the seam properties or seaming process. The release material can be cured onto the surfaces prior to the first seam fabrication to render it durable, wear resistant, and essentially permanent.

By applying the adhesive to the seam and forming the virtual seam as indicated, a cost savings of at least 5 times the cost of a seamless belt results.

The process can be used with a variety of adhesives and belt materials. Examples of belt substrate materials include semiconductive polyimides such as polyanaline polyimide, carbon filled polyimides, carbon filled polycarbonate, carbon filled polyesters, and the like. Examples of commercially available polyimide substrates include KAPTON® and UPLIEX® both from DuPont, and ULTEM from GE. Example of commercially available polyesters include Mylar® from Dupont, and the like.

The process can work well with filled materials as well. Therefore, a substrate housing the adhesive seam may include a filler. Preferably, the filler, if present in the substrate, is present in an amount of from about 1 to about 60, or from about 3 to about 40 percent by weight of total solids. Examples of suitable fillers for use in the substrate include carbon fillers, metal oxide fillers, doped metal oxide fillers, other metal fillers, polymer fillers, other conductive fillers, and the like. Specific examples of fillers include carbon fillers such as carbon black, fluorinated carbon black, graphite, low conductive carbon, and the like, and mixtures thereof; metal oxides such as indium tin oxide, zinc oxide, iron oxide, aluminum oxide, copper oxide, lead oxide, and the like, and mixtures thereof; doped metal oxides such as antimony-doped tin oxide, antimony-doped titanium dioxide, aluminum-doped zinc oxide, similar doped metal oxides, and mixtures thereof; and polymer particles such as polytetrafluoroethylene, polypyrrole, polyanaline, doped polyanaline, polythiophene and the like, and mixtures thereof. Examples of specific fillers include carbon black, antimony doped tin oxide, doped polyanaline, and mixtures thereof.

Figure 10:
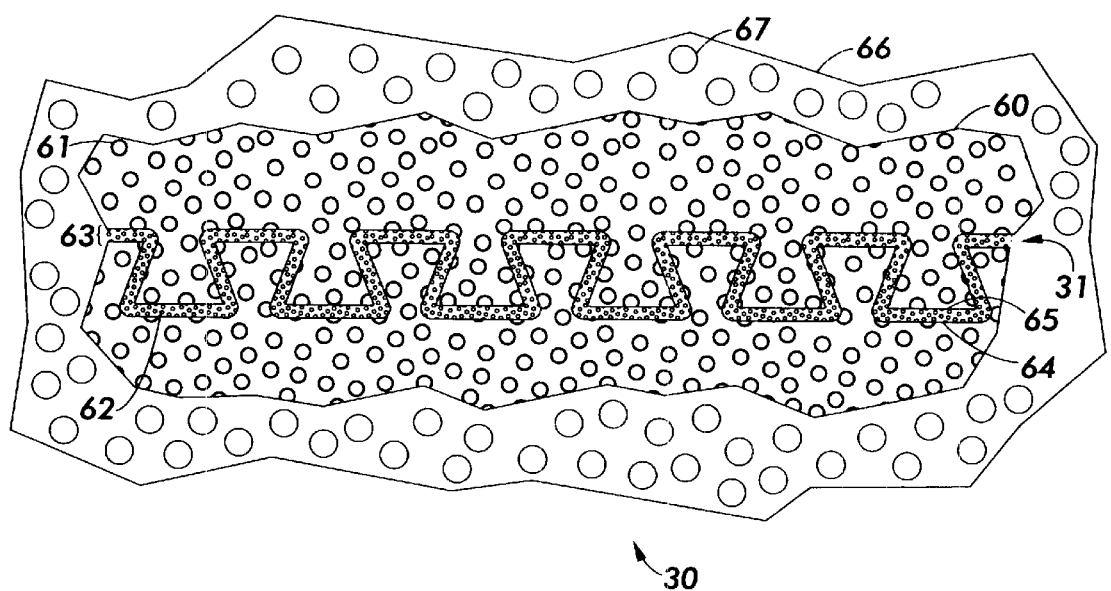
FIG. 10 is an enlarged cross-sectional view of a belt according to a preferred embodiment of the invention.

An example of a preferred component made by the process of the present invention is depicted in FIG. 10. The belt 30 comprises a substrate 60, having therein, in preferred embodiments, conductive fillers 61. The belt contains seam 31 having an adhesive 63 positioned between the seam members 64 and 65. In a preferred embodiment, conductive fillers 62 are dispersed or contained in the adhesive. In an optional embodiment of the invention, an overcoat 66 is provided in the substrate 60. The overcoat may contain conductive fillers 67. Conductive fillers 61 optionally dispersed or contained on the substrate, fillers 67 optionally dispersed or contained in the optional overcoat, and fillers 62 optionally contained or dispersed in the adhesive, may be the same or different.

The process herein provides an excellent seam adhesive for components. Using a two-stage or dual-cure procedure, in embodiments, a fully filled, void-free, high quality seam interface enabling image-on-seam performance can be prepared. The adhesive, in embodiments, has the same or similar mechanical and surface release properties as the substrate. Further, the adhesive, in embodiments, provides good bonding strength to the substrate seam members. The resistivity of the adhesive can be tuned into the same range as the substrate by changing the loading level of the conductive filler, by mixing different ratios of the conductive fillers, or by varying curing conditions.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1

Preparation of Intermediate Transfer Belt

A polyimide film substrate was obtained from DuPont. The belt substrate comprised polyaniline and carbon filled polyimide. The resistivity was tested and found to be from about $10^9$ to about $10^{10}$ ohm-cm. The belt ends that were to be joined were subjected to a "chemical etch" treatment to help improve adhesion. The puzzle cut ends were dipped in 1N aqueous NaOH solution for about 10 minutes, followed by 10 minutes in 1N aqueous HCl solution. The ends were rinsed with distilled water and allowed to dry.

Example 2

Preparation of Intermediate Transfer Belt

A polyimide film substrate was obtained from DuPont. The belt substrate comprised polyaniline and carbon filled polyimide. The resistivity was tested and found to be from about $10^9$ to about $10^{10}$ ohm-cm. The belt ends that were to be joined were treated with a primer shortly before assembly, to help improve adhesion. The puzzle cut ends were wiped with a 10 percent solution of 3-aminopropyl triethoxysilane (from Aldrich) in toluene and allowed to dry for 30 minutes at 40° C.

Example 3

Preparation of Polyvinyl Butyral and Fluorinated Carbon Adhesive

A stock solution of polyvinyl butyral (PVB) adhesive was prepared by dissolving 62 grams of polyvinyl butyral (Norwood PLYMASTER® 2130) adhesive film in a mixture of 200 grams ethyl alcohol, and 100 grams 1-butyl alcohol in a 500 ml glass bottle. The mixture was allowed to mix on a roll mill overnight. Into a 4 ounce glass bottle was added 15 grams of methyl ethyl ketone (MEK), 0.128 grams of ACCUFLUOR® 2028 and 0.0425 grams ACCUFLUOR® 2010 (fluorinated carbon from Advance Research Chemicals, Inc., Catoosa, Okla.). The carbons were then dispersed in the solvent by mixing and placing the bottle in an ultrasonic bath for about 10 to 15 minutes. To the bottle was then added 0.17 grams DIAK3® (Dupont) and mixed well. About 25 grams of the PVB stock solution was added and the dispersion was mixed on a roll mill for about 1 hour.

The resulting dispersion was drawcoated onto a sheet of releasing film. Alternatively, a piece of plate glass can be used. A suitable sized coating bar was used. The coating was allowed to dry in a drying oven set at about 40° C. Once the film was dry, it was peeled off the release paper and was ready for use as a seam adhesive.

At this stage, the film did not exhibit any controlled conductivity. In fact, conductivity was only achieved when the film was subjected to a second thermal postcure step. A 0.001 inch thick sample adhesive film coated on stainless steel substrate and postcured at about 150° C. for about 30 minutes was observed to have a resistivity of about $2\times10^9$ ohm-cm. This formulation was repeated and the electrical results were found to be reproducible. It was also found that temperature and humidity changes did not affect the electrical properties of the adhesive material. The resistivity was tuned by adjusting the amount and/or type of fluorinated carbon, curatives, and postcure parameters.

Example 4
Preparation of Polyvinyl Butyral and Fluorinated Carbon Adhesive

A solution of polyvinyl butyral (PVB) adhesive was prepared by dissolving 31 grams of polyvinyl butyral (Norwood PLYMASTER® 2130) adhesive film in a mixture of 100 grams ethyl alcohol, 50 grams 1-butyl alcohol, 10 grams methyl alcohol and 1 gram of fluorosurfactant (FC-430 from 3M) in a 500 ml glass bottle. The mixture was allowed to mix on a roll mill overnight. Into an 8 ounce bottle was added 85 grams of MEK and 2.47 grams of ACCUFLUOR® 2028 (fluorinated carbon from Advance Research Chemicals, Inc., Catoosa, Okla.). The fluorinated carbon was dispersed in the solvent by vigorous mixing and then placing the bottle in an ultrasonic bath for about 10 to 15 minutes. About 1.24 grams of Dupont DIAK 3 was added to the carbon dispersion. This dispersion was then placed on the roll mill for about 15 minutes. This carbon dispersion was transferred to the bottle of PVB stock solution and the resulting mixture was mixed on a roll mill for about 1 hour. The resulting dispersion was drawcoated onto a sheet of releasing film. Alternatively, a piece of plate glass can be used. A suitable sized coating bar was used. The coating was allowed to dry in a drying oven set at about 40° C. Once the film was dry, it was peeled off the release paper and was ready for use as a seam adhesive.

At this stage, the film did not exhibit any controlled conductivity. As with the adhesive prepared in Example 2, conductivity was only achieved when the film was subjected to a thermal postcure step. A 0.001 inch thick sample film coated on stainless steel substrate and postcured at about 150° C. for about 30 minutes was observed to have a resistivity of about $2\times10^9$ ohm-cm. This formulation was repeated and the electrical results were found to be reproducible. It was also found that temperature and humidity changes did not affect the electrical properties of the adhesive material. The resistivity was tuned by adjusting the amount and/or type of fluorinated carbon, curatives, compatibilizer and postcure parameters.

Example 5
Preparation of Epoxy and Fluorinated Carbon Adhesive

A sample solution of Liquid Epoxy adhesive solution (LS-7909) was obtained from Scapa Tapes. Into a 4-ounce glass bottle were added 15 grams of MEK, 0.3 grams of ACCUFLUOR® 2028 and 0.4 grams ACCUFLUOR® 2010 (fluorinated carbons from Advance Research Chemicals, Inc., Catoosa, Okla.). The carbons were then dispersed in the solvent by mixing and placing the bottle in an ultrasonic bath for about 10 to 15 minutes. To the bottle was then added 0.2 grams DIAK3® (Dupont) and 0.1 grams 2-ethyl-4-methylimidazole and mixed well. About 10.9 grams of the epoxy adhesive solution (LS-7909) was added and the mixture was placed on a roll mill for about 1 hour.

The resulting dispersion was drawcoated onto a sheet of releasing film. A suitable sized coating bar was used. The coating was allowed to dry in a drying oven set at about 40° C. for about 3 hours. Once the film was dry, it was kept on the release paper and was ready for use as a seam adhesive.

At this stage, the film did not exhibit any controlled conductivity. In fact, conductivity was only achieved when the film was subjected to a second thermal post-cure step. A 0.001 inch thick sample adhesive film coated on stainless steel substrate and postcured at about 150° C. for about 15 minutes was observed to have a resistivity of about $8\times10^9$ ohm-cm. This formulation was repeated and the electrical results were found to be reproducible. It was also found that temperature and humidity changes did not affect the electrical properties of the adhesive material. The resistivity was tuned by adjusting the amount and/or type of fluorinated carbon, curatives, and postcure parameters.

Example 6
Preparation of Nitrile-Phenolic and Fluorinated Carbon Adhesive

A sample solution of liquid Nitrile-Phenolic adhesive solution (LS-7872) was obtained from Scapa Tapes. Into a 4-ounce glass bottle was added 15 grams of MEK, 0.15 grams of ACCUFLUOR® 2028 and 0.05 grams ACCUFLUOR® 2010 (fluorinated carbons from Advance Research Chemicals, Inc., Catoosa, Okla.). The carbons were then dispersed in the solvent by mixing and placing the bottle in an ultrasonic bath for about 10 to 15 minutes. To the bottle was then added 0.20 grams DIAK3® (Dupont) and mixed well. About 10.9 grams of the Nitrile-Phenolic solution was added and the dispersion was mixed on a roll mill for about 1 hour.

The resulting dispersion was drawcoated onto a sheet of releasing film. A suitable sized coating bar was used. The coating was allowed to dry in a drying oven set at about 40° C. Once the film was dry, it was kept on the release paper and was ready for use as a seam adhesive.

At this stage, the film did not exhibit any controlled conductivity. In fact, conductivity was only achieved when the film was subjected to a second thermal post-cure step. A 0.001 inch thick sample adhesive film coated on stainless steel substrate and post-cured at about 200° C. for about 15 minutes was observed to have a resistivity of about $8\times10^9$ ohm-cm. This formulation was repeated and the electrical results were found to be reproducible. It was also found that temperature and humidity changes did not affect the electrical properties of the adhesive material. The resistivity was tuned by adjusting the amount and/or type of fluorinated carbon, curatives, and post-cure parameters.

Example 7
Preparation of LUCKAMIDE® (polyamide) and DHTBD Adhesive

A stock dispersion of carbon black was prepared by attriting 10 grams of Black Pearls® 2000 along with 10 grams LUCKAMIDE® dispersed in 150 grams 1-propanol for about 3 hours, using a bench top attritor charged with 3/16" stainless steel shot media. The slurry was filtered through a course screen to separate out the media and the carbon dispersion was collected in an 8 ounce polyethylene bottle.

About 100 grams LUCKAMIDE® was added to a mixture of 150 grams methanol and 150 grams 1-propanol in a 1000-ml bottle. The bottle was warmed to about 60° C. until the resin had completely dissolved. To the warm LUCKAMIDE® solution was added 60 grams DHTBD and the solution was mixed well until all the solid has dissolved. To this solution was then added 4.2 grams of oxalic acid dissolved in a minimal amount of methanol and also 14 grams of Black Pearls® 2000 (carbon black) dispersion. The mixture was placed on a roll mill for 1 hour to ensure complete mixing.

The resulting dispersion was drawcoated onto a sheet of TEDLAR®. A suitable sized coating bar was used. The coating was allowed to dry in a drying oven set at about 40° C. for about 3 hours. Once the film was dry, it was kept on the release liner and was ready for use as a seam adhesive. The prepared adhesive tape was stored at below 0° C to maintain shelf life.

Example 8
Preparation of Image-on-seam Puzzle Cut Seamed Belt Using Two Stage Process The two puzzle cut ends of the polyimide film prepared in Example 1 were brought together and aligned on the lower jaw of a modified Technoseal Vertrod Thermal Impulse Heat Sealer (Mod. 20EP/P-¼-WC-CAN-DIG-I) with the assistance of vacuum holddown tables mounted on both sides of a welder. A freestanding film of the adhesive (preferably about 15—125 microns thick) formed in accordance with Examples 3 or 4 was selected. A narrow strip (about 3/16 inch wide) of material was cut to a length and width sufficient to adequately cover the puzzle-cut seam area on the belt substrate. The strip of adhesive was laid across the top of the seam area covering the seam. The welder was "programmed" to weld at a clamping pressure of 2 psi and an initial temperature of about 235° F. for 3 minutes then ramped to about 320° F. for an additional 30 minutes while continuing to hold the clamping pressure at 2 psi. The two-step welding was performed as a continuous process in the welder. This caused the adhesive film to melt and flow into the seam area filling it completely, followed by crosslinking of the adhesive and activation of the conductivity.

The seamed belt was removed from the fixture and the seam was subjected to finishing (sanding) and polishing steps to remove excess adhesive and bring the seam area topography in line with the rest of the belt.

This procedure was repeated using the adhesives formed in Examples 5 and 6.

Example 9
Preparation of High Strength Puzzle Cut Seamed Belt Using Two Stage Process and Higher Pressure The two puzzle cut ends of the polyimide film prepared in Example 2 were brought together and aligned on the lower jaw of a Sencorp Heat Sealer (Sencorp Systems Inc., Hyannis Mass., Model 12ASL/1). A film of the adhesive (preferably about 15–125 microns thick) formed in accordance with Example 7 was selected. A narrow strip (about 3/16 inch wide) of material was cut to a length and width sufficient to adequately cover the puzzle-cut seam area on the belt substrate. The strip of adhesive was laid across the top of the seam area covering the seam The welder was "programmed" to weld at a clamping pressure of 30 psi and an initial temperature of 130° C. for 5 minutes, and then ramped to about 160° C. for an additional 30 minutes while continuing to hold the clamping pressure at 30 psi. The two-step welding was performed as a continuous process in the welder. This caused the adhesive film to melt and flow into the seam area filling it completely, followed by crosslinking of the adhesive and activation of the conductivity.

The seamed belt was removed from the fixture and the seam was subjected to finishing (sanding) and polishing steps to remove excess adhesive and bring the seam area topography in line with the rest of the belt.

Example 10
Preparation of High Strength Puzzle Cut Seamed Belt Using Multiple Temperature Two Stage Process The two puzzle cut ends of the polyimide film prepared in Example 2 were brought together and aligned on the lower jaw of a Sencorp Heat Sealer (Sencorp Systems Inc., Hyannis Mass., Model 12ASL/1). A film of the adhesive (preferably about 15–125 microns thick) formed in accordance with Example 7 was selected. A narrow strip (about 3/16 inch wide) of material was cut to a length and width sufficient to adequately cover the puzzle-cut seam area on the belt substrate. The strip of adhesive was laid across the top of the seam area covering the seam The welder was "programmed" to weld at a clamping pressure of 60 psi and an initial temperature for the first plate of 100° C. and an initial temperature for the bottom plate of 155° C. for 3 minutes then the first plate was ramped to 150° C. for an additional 6 minutes while continuing to hold the clamping pressure at 60 psi. The multiple temperature, two-step welding was performed as a continuous process in the welder. This caused the adhesive film to melt and flow into the seam area filling it completely, followed by crosslinking of the adhesive and activation of the conductivity.

The seamed belt was removed from the fixture and the seam was subjected to finishing (sanding) and polishing steps to remove excess adhesive and bring the seam area topography in line with the rest of the belt.

The tensile strengths of the seams made in accordance with Examples 7, 8, and 9 were evaluated. All exhibited strength values above 20 pounds per linear inch along the seam widths. The seams made using the multiple temperature, dual step process exhibited some of the highest strength values and were produced in the shortest overall cycle times.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A process for forming a seamed film component, by bonding mutually mating members of a seam wherein said film component comprises a seam having a first side and a second side and said seam comprising mutually mating members, wherein said process comprises:
   a) compounding an adhesive;
   b) forming said adhesive in contact with said first side of said seam and said mutually mating members;
   c) contacting said adhesive and first side of said seam to a first heated clamp;
   d) contacting said second side of said seam to a second heated clamp;
   e) while said seam is still in contact with said first heated clamp and said second heated clamp, subjecting said adhesive in contact with said mutually mating members to a first cure at a first temperature; and
   f) while said seam is still in contact with said first heated clamp and said second heated clamp, subjecting said adhesive to a second cure at a second temperature to form a dual-cured adhesive, wherein said second temperature is higher than said first temperature.

2. A process in accordance with claim 1, wherein said first temperature is from about 40 to about 250° C.

3. A process in accordance with claim 2, wherein said first temperature is from about 40 to about 150° C.

4. A process in accordance with claim 1, wherein said second temperature is from about 120 to about 250° C.

5. A process in accordance with claim 4, wherein said second temperature is from about 150 to about 200° C.

6. A process in accordance with claim 1, wherein said first cure is at a time of from about 1 second to about 24 hours.

7. A process in accordance with claim 6, wherein said first cure is at a time of from about 1 minute to about 2 hours.

8. A process in accordance with claim 1, wherein said second cure is at a time of from about 30 seconds to about 24 hours.

9. A process in accordance with claim 1, wherein said second cure is at a time of from about 10 minutes to about 1 hour.

10. A process in accordance with claim 1, wherein said first cure and said second cure are at a pressure of from about 0.5 to about 100 psi.

11. A process in accordance with claim 10, wherein said first cure is at a pressure of from about 2 to about 60 psi.

12. A process in accordance with claim 10, wherein said second cure is at a pressure of from about 0.5 to about 30 psi.

13. A process in accordance with claim 1, wherein one of said first or second heated clamp has a temperature that is from about 2 to about 100° C. higher than that of the other heated clamp.

14. A process in accordance with claim 13, wherein one of said first or second heated clamp has a temperature that is from about 10 to about 30° C. higher than that of the other heated clamp.

15. A process in accordance with claim 1, wherein subsequent to f), said seam is subjected to a sanding procedure to smooth said seam.

16. A process in accordance with claim 1, wherein subsequent to f), said seam has a volume resistivity of from about $10^1$ to about $10^{13}$ ohm-cm.

17. A process in accordance with 16, wherein said volume resistivity is from about $10^8$ to about $10^{11}$ ohm-cm.

18. A process in accordance with claim 1, wherein said adhesive comprises a hot-melt processable, thermosetting resin.

19. A process in accordance with claim 18, wherein said hot-melt processable, thermosetting resin is selected from the group consisting of polyvinyl butyral resins, phenolic resins, epoxy resins, polyamide resins and mixtures thereof.

20. A process in accordance with claim 18, wherein said adhesive further comprises an electrically conductive filler.

21. A process for forming a seamed puzzle cut component, by bonding mutually mating members of a seam wherein said component comprises a puzzle cut seam having a first side and a second side, and said seam comprising mutually mating members, each member having a puzzle cut form, wherein said process comprises:

a) compounding an adhesive;

b) forming said adhesive in contact with said first side of said seam and in further contact with said puzzle cut mutually mating members;

c) contacting said adhesive and first side of said seam to a first heated clamp;

d) contacting said second side of said seam to a second heated clamp;

e) while said seam is still in contact with said first heated clamp and said second heated clamp, subjecting said adhesive in contact with said mutually mating members to a first cure at a first temperature; and f) while said seam is still in contact with said first heated clamp and said second heated clamp, subjecting said adhesive to a second cure at a second temperature to form a dual-cured adhesive, wherein said second temperature is higher than said first temperature.

22. A process for forming a seamed film component, by bonding mutually mating members of a seam wherein said film component comprises a seam having a first side and a second side and comprising mutually mating members, wherein said process comprises:

a) compounding an adhesive comprising a hot-melt processable, thermosetting resin and an electrically conductive filler;

b) forming said adhesive in contact with said first side of said seam and said mutually mating members;

c) contacting said adhesive and first side of said seam to a first heated clamp;

d) contacting said second side of said seam to a second heated clamp;

e) while said seam is still in contact with said first heated clamp and said second heated clamp, subjecting said adhesive in contact with said mutually mating members to a first cure at a first temperature; and f) while said seam is still in contact with said first heated clamp and said second heated clamp, subjecting said adhesive to a second cure at a second temperature to form a dual-cured adhesive, wherein said second temperature is higher than said first temperature.

23. A process in accordance with claim 1, wherein said mutually mating members are in a puzzle cut form.

24. A process for forming a seamed film component, by bonding mutually mating members of a seam wherein said film component comprises a seam having a first side and a second side and said seam comprising mutually mating members in a puzzle cut form, wherein said mutually mating members comprise a first projection and a second receptacle geometrically oriented so that said second receptacle on a first end receives the first projection on a second end, and wherein said first projection on the first end is received by the second receptacle on the second end, wherein said process comprises:

a) compounding an adhesive;

b) forming said adhesive in contact with said first side of said seam and said mutually mating members;

c) contacting said adhesive and first side of said seam to a first heated clamp;

d) contacting said second side of said seam to a second heated clamp;

e) while said seam is still in contact with said first heated clamp and said second heated clamp, subjecting said adhesive in contact with said mutually mating members to a first cure at a first temperature; and f) while said seam is still in contact with said first heated clamp and said second heated clamp, subjecting said adhesive to a second cure at a second temperature to form a dual-cured adhesive, wherein said second temperature is higher than said first temperature.

* * * * *